(12) United States Patent
Steven et al.

(10) Patent No.: US 9,359,047 B2
(45) Date of Patent: Jun. 7, 2016

(54) MOBILE BARGE AND METHOD OF OPERATION OF MOBILE BARGE

(75) Inventors: Iain Hughes Steven, Bridge of Weir (GB); Michael Terence Linke, Sketty (GB); Amy Louise Linke, legal representative, Wales (GB); John Gordon Davies, Aberdeen (GB)

(73) Assignee: Celtic Design Consultants Limited, Glasgow (GB)

( * ) Notice: Subject to any disclaimer, the term of this patent is extended or adjusted under 35 U.S.C. 154(b) by 49 days.

(21) Appl. No.: 14/122,537

(22) PCT Filed: May 8, 2012

(86) PCT No.: PCT/EP2012/058474
§ 371 (c)(1),
(2), (4) Date: Aug. 4, 2014

(87) PCT Pub. No.: WO2012/163635
PCT Pub. Date: Dec. 6, 2012

(65) Prior Publication Data
US 2014/0366792 A1 Dec. 18, 2014

(30) Foreign Application Priority Data

May 27, 2011 (GB) .................................. 1109123.8

(51) Int. Cl.
*B63B 35/00* (2006.01)
*F03D 1/00* (2006.01)
*B63B 35/28* (2006.01)
(Continued)

(52) U.S. Cl.
CPC ............... *B63B 35/003* (2013.01); *B63B 35/28* (2013.01); *E02B 17/0034* (2013.01); *E02B 17/021* (2013.01); *F03D 1/001* (2013.01); *F03D 1/005* (2013.01); *E02B 2017/006* (2013.01);
(Continued)

(58) Field of Classification Search
CPC ................................. B63B 35/44; B63B 35/40
USPC ........................... 114/260, 265; 405/198, 200
See application file for complete search history.

(56) References Cited

U.S. PATENT DOCUMENTS 3,001,370 A * 9/1961 Templeton ............ E02B 17/021
114/265
4,602,894 A   7/1986 Lorenz et al.
(Continued)

FOREIGN PATENT DOCUMENTS

CN      101973501 A    2/2011
GB       1 446 751     8/1976
(Continued)

OTHER PUBLICATIONS

PCT/ISA/210 issued in PCT/EP2012/058474, with a mailing date of Jul. 24, 2012 (5 pages).
(Continued)

*Primary Examiner* — Lars A Olson
(74) *Attorney, Agent, or Firm* — Buchanan Nipper

(57) ABSTRACT

A vessel comprising a primary platform (1003) moveably connected to a secondary platform (1029) by one or more legs (1007, 1009, 1011, 1013) is disclosed. The primary and secondary platform (1003, 1029) are moveable along the legs, wherein the secondary platform is moveable independently from the primary platform. The invention has particular application in the repair maintenance, and construction of wind turbines.

22 Claims, 2 Drawing Sheets

(51) Int. Cl.
 *E02B 17/00* (2006.01)
 *E02B 17/02* (2006.01)

(52) U.S. Cl.
 CPC ............ *F05B2240/95* (2013.01); *Y02E 10/727* (2013.01); *Y10T 29/49718* (2015.01)

(56) References Cited

U.S. PATENT DOCUMENTS

| 8,070,388 | B2 | 12/2011 | Thomas |
| 2008/0131209 | A1 | 6/2008 | Thomas |
| 2011/0139056 | A1 | 6/2011 | Cholley et al. |
| 2011/0150623 | A1 | 6/2011 | Thomas et al. |
| 2012/0055389 | A1* | 3/2012 | Quah .................... E02B 17/021 114/265 |

FOREIGN PATENT DOCUMENTS

| GB | 2 350 326 A | 11/2000 |
| JP | 58-000510 | 1/1983 |
| WO | WO 2005/083183 A1 | 9/2005 |
| WO | WO 2009/150383 A1 | 12/2009 |
| WO | WO 2009/153530 A2 | 12/2009 |

OTHER PUBLICATIONS

PCT/IPEA/408 issued in PCT/EP2012/058474, with a mailing date of May 29, 2013 (7 pages).
Search Report issued in Application No. GB 1109123.8 dated Jul. 26, 2011 (3 pages).
Search Report issued in Application No. GB 1209211.0 dated Aug. 1, 2012 (3 pages).

* cited by examiner

MOBILE BARGE AND METHOD OF OPERATION OF MOBILE BARGE

FIELD OF INVENTION

This invention relates to a vessel, and more particularly to a mobile vessel or barge. Further this invention relates to a barge for use with an offshore wind turbine and in particular to a barge for use with offshore wind turbine farms as well as for use with sub-sea turbines, sub-sea turbine farms, oil and gas structures and generally with offshore platforms.

BACKGROUND OF THE INVENTION

Wind turbines for generating power have become increasingly commonplace in recent years. However, wind turbines are often located offshore in a position which maximises the amount of power which can be generated from the turbine. Using an offshore location for the wind turbine also reduces the visual impact of the turbine since the offshore location is generally located away from population centres.

Although an offshore location for a wind turbine may be desirable for the above mentioned reasons; this presents a difficulties in terms of building and maintaining a wind turbine. This may be particularly the case for larger wind turbines which may be 100 metres or so in height and hundreds of kilometres offshore.

Current barges for use with wind turbines include a floating platform or jack-up vessel having one or more cranes. In operation, the crane may be used in construction of the wind turbine to lift various parts of the wind turbine into position. However, particularly for larger wind turbines, moving wind turbine components from the barge to their location on the wind turbines has a number of problems. Firstly, this operation is rather weather dependent since components need to be lifted from the deck of the mobile barge to their position on the wind turbine, which may be in excess of 100 meters above the sea level. For example, in windy conditions or in rough sea conditions it may be impossible to use a crane to lift the various components into position. Furthermore, even in good conditions, the use of a crane to lift components into position is difficult and dangerous due to communication difficulties between the crane operator and crew on the barge and on the turbine. In the event of failure of the crane, serious accidents can occur which may compromise the safety of the crew, work teams, and even the turbine tower and vessel itself.

Published UK patent application number GB 2350326 A describes a method of recovering material from the seabed using a jack-up rig. The rig has upper and lower decks which are independently moveable. In order to recover material from the seabed, buoyancy tanks within the lower deck are flooded by pumping water from the sea to lower the lower deck towards the seabed. Umbilical lines L connect ancillary equipment on the lower deck with the control systems of the upper deck, thereby allowing controlled movement of the lower deck.

Published Japanese patent application number JP58000510 A describes how the stability of an offshore working platform having a number of legs may be improved. The platform has an upper working base and a lower working base which are vertically moveable relative to the legs. After the legs are landed on the seabed, a lower working base is lowered to improve the stability of the platform.

However, the rig and platform described above suffer from a number of problems which make them unsuitable for installing or repairing an offshore structure. Firstly, they are not self propelled and must be manoeuvred into position with a tug. This, however, does not allow the position of the vessel to be precisely controlled, which is necessary when installing or repairing an offshore structure.

Secondly, although each of the lower and upper decks includes means to lower or raise itself with respect to the legs so that the upper and lower decks are moveable independently of each other, this mode of operation is not in general suitable for raising heavy components above the water's surface so that they can be installed or replaced on tall offshore structures such as wind turbines. Further, it is not possible to raise components above the sea level by pumping air into buoyancy tanks flooded with water. This method of recovering material from the seabed is also problematic regarding lateral stability of the load unless the load is very evenly distributed or unless stability tanks are provided. As a result, the lowerable deck can often jam on the legs.

SUMMARY OF THE INVENTION

The invention aims to address these problems by providing a vessel for installing or repairing an offshore structure, the vessel moveably connected to at least one elongate support member. The vessel comprises a platform moveably connected to the or at least one further elongate support member in which the vessel and platform are moveable in an elongate direction along the or each elongate support member wherein the vessel comprises a first drive means for moving or driving the vessel along one of the elongate support members and the platform comprises a second drive means for moving or driving the platform along one of the elongate support members; and a drive control means for controlling operation of the first and second drive means, wherein the drive control means is configured to control the first and second drive means in a first mode of operation in which the vessel and platform are synchronously driven along one of the elongate support members and a second mode of operation in which the platform is driveable independently from the vessel. Usually, the offshore structure is a wind turbine, or wave generator, or tidal turbine or oil well platform and the like.

Thus heavy and large components may be installed at an offshore structure more safely and quickly than is the case with known jack-up vessels. Further, by synchronising the first and second drive means, less jacking equipment and gearboxes are required on the vessel part.

In one aspect of the present invention, a primary platform is coupled to a secondary platform by one or more legs, the primary platform and secondary platform being moveable along the legs, wherein the secondary platform is moveable independently from the primary platform. By having such a secondary platform, this reduces the height above the primary platform to which components need to be lifted to by crane. Preferably, each elongate support member is a leg which may be suitable for contacting the seabed. Preferably, the primary platform is coupled to the secondary platform by 4 legs. Further, usually, each of the legs extends in substantially a vertical direction. Thus the primary platform and secondary platform may be vertically moveable along the legs. The elongate support member may be moveable between one position in which it is in contact with the seabed. In this mode of operation, the support members transfer weight from the vessel and the platform to the seabed. In a second mode of operation, the elongate support members do not contact the seabed. This allows the vessel to move relative to the offshore structure.

According to a further aspect of the present invention, a vessel is provided which is moveably connected to at least one elongate support member, the vessel comprising; a platform moveably connected to the or at least one further elongate support member in which the vessel and platform are moveable in an elongate direction along the or each elongate support member, wherein the platform is moveable independently from the vessel. Preferably, the vessel is moveable along the or each support member independently of the movement of the platform along the or each support member. Usually, the vessel water-faring vessel such as sea-faring vessel. The vessel is primarily designed for installing or repairing or maintaining or servicing an offshore structure, but embodiments of the invention may have further applications falling within the scope of the appended claims.

According to a further aspect of the present invention, a method of installing or repairing a wind turbine, or wave generator, or tidal turbine or oil well platform is disclosed. The method comprises the steps of moving one or more elongate support members relative to the vessel from a raised position in which the elongate support members are not in contact with the seabed to a lowered position in which the elongate support members are in contact with the seabed; moving a platform from a first position, A, in which the platform is in close proximity to the vessel to a second position, B, in which the platform is closer to the wind turbine, or wave generator or tidal turbine or well than when at the first position. Preferably, the method comprises transporting, using a vessel, one or more components to an offshore location. The method may further comprise the step of moving the vessel relative to one or more of the elongate support members such that the vessel is at least partially moved away from the seabed. The vessel and platform may be moved in a substantially synchronous manner relative to the or each elongate support member. The method may further comprise the step of energising at least one secondary jacking system. The method may comprise moving the vessel and platform at substantially the same rate.

According to a further embodiment, a method of modifying a vessel is disclosed. The vessel comprises a vessel moveably connected to at least one elongate support member, the method comprising the steps of: moveably connecting a platform to the or at least one further elongate support member in which the vessel and platform are moveable in an elongate direction along the or each elongate support member, wherein the platform is moveable independently from the vessel.

According to a further aspect of the present invention, a method of installing or repairing an offshore structure using a vessel moveably connected to at least one elongate support member is disclose. The method may comprise using a vessel comprising a platform moveably connected to the or at least one further elongate support member in which the vessel and platform are moveable in an elongate direction along the or each elongate support member; wherein the vessel comprises a first drive means for moving the vessel along one of the elongate support members and the platform comprises a second drive means for moving the platform along one of the elongate support members. The method may comprise controlling operation of the first and second drive means, using a drive control means, wherein the drive control means is configured to control the first and second drive means in a first mode of operation in which the vessel and platform are synchronously driven along one of the elongate support members and a second mode of operation in which the platform is driveable independently from the vessel.

The vessel usually comprises 4 elongate support members. Having 4 elongate support members may provide sufficient space on the vessel and platform for transporting large components such as a wind turbine or blade. Usually, the elongate support members are substantially parallel to each other. Usually, the elongate support member further comprises a foot member for contacting the seabed. The vessel and the platform may be moveable along the same support member. The vessel and platform may be substantially planar. The relative positions of the vessel, platform and elongate support members may be configured to form a substantially cuboid shape. The elongate support members are usually constructed so that they are suitable for contacting the seabed.

The vessel and elongate support members may be arranged to at least partially raise the vessel out of water when a drive means is energised. The vessel and platform may be connected to the same elongate support member. Usually the vessel comprises at least 1 secondary jacking system or secondary jacking means. The vessel is usually a mobile barge for repairing or installing a wind turbine, or wave generator, or tidal turbine or oil well platform. Usually the vessel is non-submersible, since the vessel may be designed to remain on the water's surface during all modes of operation. In some modes of operation, the elongate member and the first drive means are arranged so that the vessel may be raised from a position in which the vessel is in contact with a water surface to a position in which the vessel is not in contact with the water surface.

The vessel may be moveable in a direction substantially perpendicular to a planar face of the vessel and in particular in which the platform is moveable in a direction substantially perpendicular to a planar face of the platform. The vessel may comprise a planar face of the platform having an area which is less than a planar face of the vessel. The vessel may further comprise one or more locking means for locking the position of the platform on the or each elongate support member in position. Usually the drive control means is configured to drive the first drive means to displace the vessel towards one end of the elongate support member and particularly the control means may be configured to drive the second drive means to displace the platform towards the same end of the elongate support member. Usually, the platform is positioned above a hull for providing a buoyancy force. Usually, the drive control means is configured to control the first and second drive means to raise both the vessel and platform out of the water supporting the vessel.

Preferably, a platform extension is provided. The platform extension may be connected to the platform or vessel. The extension may provide close access to the base of an offshore structure, close to the sea surface, or may provide close access to a turbine structure which may be located further away from the sea surface. Usually, the vessel is positioned substantially below the platform. The platform may have a mass which is less than the mass of the vessel. The secondary platform may have a mass which is less than the mass of the primary platform.

BRIEF DESCRIPTION OF THE DRAWINGS

An embodiment of the invention will now be described, by way of example only, and with reference to the accompanying drawings in which.

The following description is of a mobile barge for use with a wind turbine, although this is exemplary, and other applications of the invention will also be discussed. The mobile barge is not necessarily limited for use with a wind turbine, and other advantageous applications will be also discussed. For example, the mobile barge may be advantageously used for oil field well intervention. Usually, the barge embodying the invention is self-propelled, and self elevating. The barge may be a work-over barge comprising accommodation and maintenance facilities. The barge may be capable of positioning itself alongside offshore structures without the aid of assisting vessels.

Figure 1:
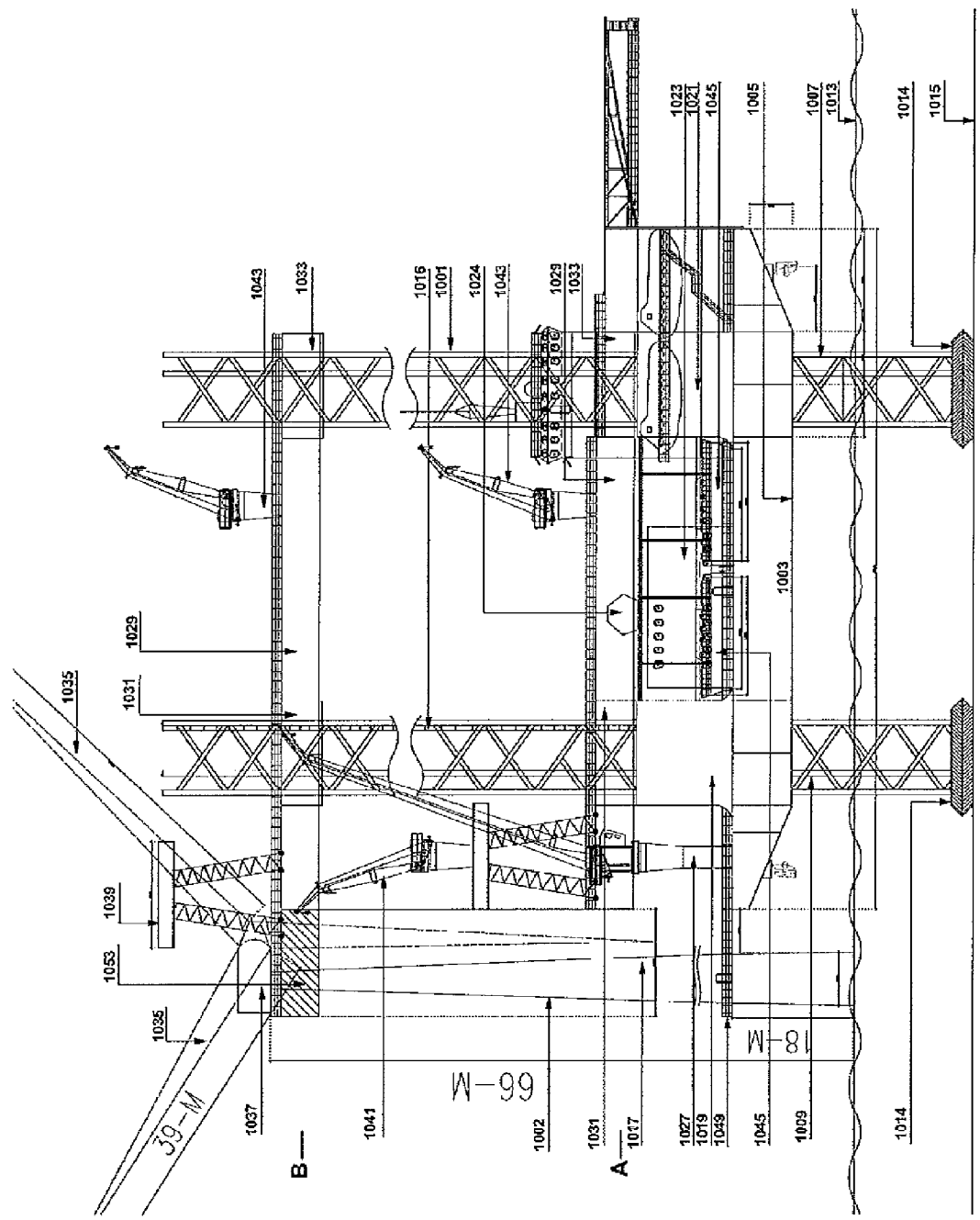
FIG. 1 shows a section through a mobile barge according to an embodiment of the invention located in close proximity to a wind turbine.
Figure 2:
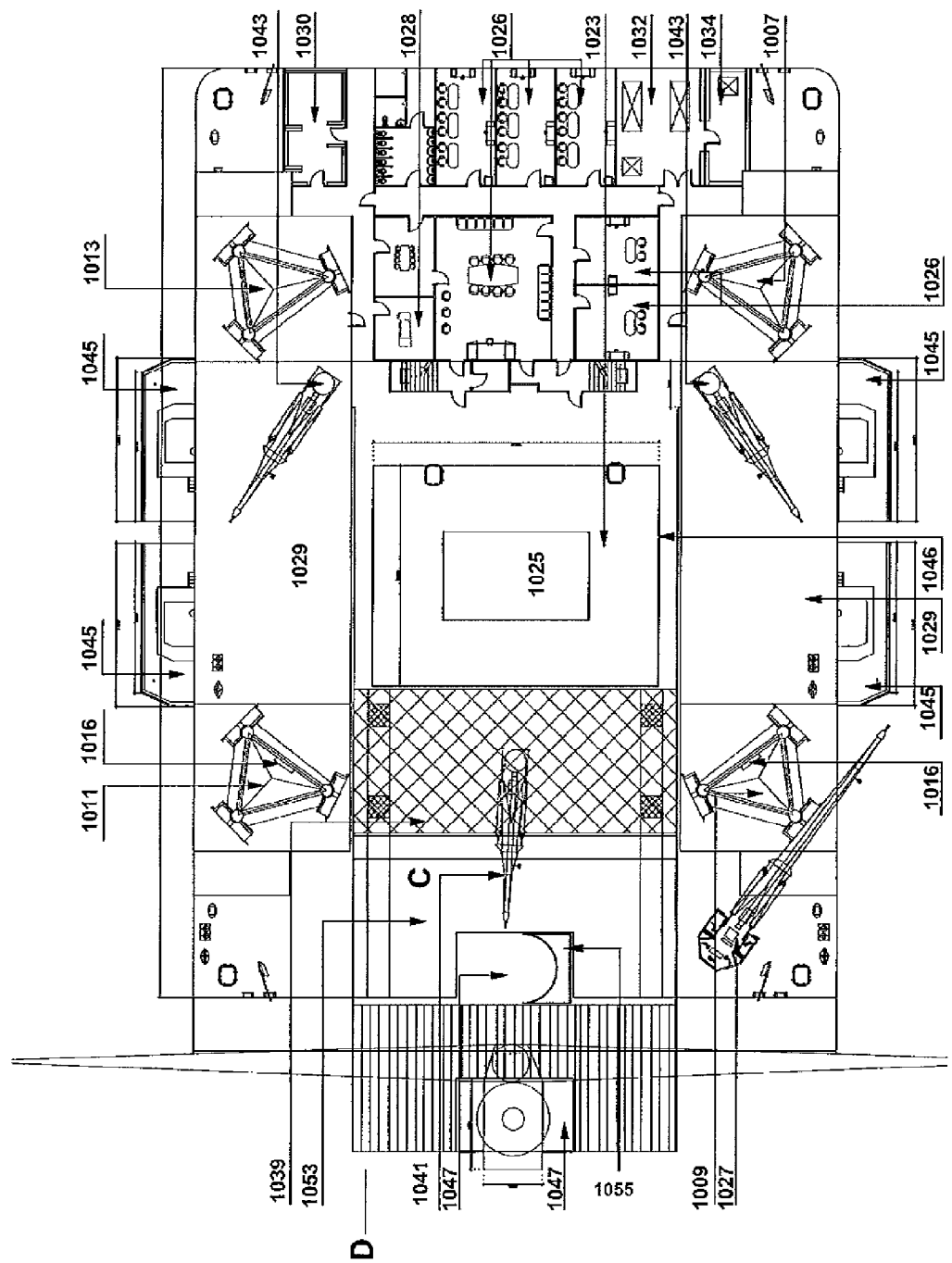
FIG. 2 shows a plan view of the mobile barge of FIG. 1.

Referring now to FIGS. 1 and 2 of the drawings, these show sectional and elevation views respectively through a mobile barge 1001 according to an embodiment of the invention. In FIG. 1 of the drawings, the mobile barge is positioned in close proximity to a wind turbine 1002.

The mobile barge comprises a primary platform 1003. The primary platform 1003 may be substantially planar. In the embodiments shown in FIGS. 1 and 2, the primary platform 1003 is substantially rectangular in plan. For example, the primary platform 1003 may have a width of approximately 40 meters and a length of approximately 70 meters and a depth of approximately between 4 to 5 meters. The primary platform has two substantially planar outer surfaces, one which is oriented in a direction facing away from the sea, and the other surface which is oriented in a direction towards the sea.

The barge shown in FIGS. 1 and 2 comprises a primary hull 1005. The primary hull 1005 may be rigidly attached to the primary platform by welding or riveting or another suitable attachment means. The barge or vessel may further comprise a secondary platform 1029. Usually, the primary platform is attached to the hull immovable with respect to the hull of the vessel. The barge shown in FIGS. 1 and 2 has 4 legs 1007, 1009, 1011, 1013, such as lattice legs. The legs may be triangular or square in cross section and may be a truss-type leg or open plate structure type leg. Each leg may comprise 2 rack chords and 2 guides, 3 chords or 4 chords, each leg with a rack on the inboard chord. The rack may be a treble tooth rack. The rack cooperates with a pinion on each a jacking system, described in further detail below.

Each leg may be elongate in one axis and may have a length of approximately 180 metres although each leg may in principle, be shorter or longer than this. Each leg may further comprise one or more footings, mat or feet or spud cans 1014 located at one end of each leg, which contact the sea bed when the legs are in a lowered position.

The footing may comprise one or more skirts. The skirt may be plates, which may be substantially vertical, that penetrate the soil approximately 0.3 m. The skirt allows eccentric support from the seabed and impacts during the installation stage, thereby improving stability. Jetting nozzles may be provided in each leg footing. The footing may be provided with a piping system for evacuating water from within the skirt area. Each water evacuation system is equipped with a butterfly valve that may be pneumatically operated from the deck of the vessel. A manifold is provided just above the footing to enable testing and cleaning of each jetting nozzle when the legs are fully retracted. The combination of the open skirted bottom and a jetting system reduces the disturbance to the seabed.

Each leg 1007, 1009, 1011, 1013 may further comprise an escape ladder 1016. The escape ladder may be substantially elongate and may be substantially parallel to the elongate axis of each leg. The escape ladder may be offset from the central axis of each leg. Further, each leg may be arranged so that the elongate axis of each leg is substantially perpendicular to the planar face of the primary platform 1003. The primary platform 1003 and each leg are movably connected to each other, and this will be explained in further detail below.

Each leg may extend away from the primary platform 1003 a certain distance from each substantially planar outer surface of the primary platform 1003. As explained in further detail below, this means that the primary platform and each leg are moveably connected to each other. As will be explained in further detail below, in some modes of operation, the primary platform 1003 moves relative to each leg 1007, 1009, 1011, 1013. In other modes of operation, each leg 1007, 1009, 1011, 1013 moves relative to the primary platform 1003.

Further, as shown in FIG. 1, the primary hull 1005 is elevated above the level of the sea 1013 by the legs 1007, 1009, 1011, 1013 which are in a lowered position. However, as will be explained in further detail below, the legs 1007, 1009, 1011, 1013 may be retracted to a raised position so that they are not in contact with the seabed 1015, so that the hull 1005 is in contact with the sea. In this way, the barge may float on the surface of the sea allowing a propulsion system, which may include one or more propellers 1051, 1053, to move the barge relative to the wind turbine tower 1017. Usually the propulsion system comprises an azimuthing thruster which may have a fixed pitch propeller. The thrusters may be located at bow and stern of the vessel. Usually the propulsion system comprises an internal combustion engine which is usually positioned in a non-submersible part of the vessel or hull. The internal combustion engine may be coupled to the thrusters using a transmission means, or generate electrical power and drive an electric motor which for transmission of drive power to a thruster. This is usually referred to as a diesel electric system.

Each leg 1007, 1009, 1011, 1013 may extend through the primary platform 1003 via an aperture in the primary platform 1003. This means that each leg may be positioned such that it is within the overall footprint of the primary platform 1003, when viewed from above, as shown in FIG. 2.

In the embodiment shown in FIGS. 1 and 2, the mobile barge comprises 4 legs 1007, 1009, 1011, 1013, although any number of legs may be provided, such as 1, 2, 3, 5 or more legs.

The primary platform 1003 shown in FIGS. 1 and 2 further comprises one or more primary jacking systems 1019, 1021 which allows the primary platform 1003 and each leg 1007, 1009, 1011, 1013 to move relative to each other.

The primary platform 1003 may also comprise one or more of the following additional, but optional, components shown in FIGS. 1 and 2; a workshop 1023 preferably having a removable panel 1025, such as a removable roof panel. The vessel may further comprise a pedestal crane 1027, a helicopter landing area, office space 1026 and accommodation, central control station or bridge, safety and associated domestic systems, tanks, bulk and ballast systems, in-field maintenance vessels, evacuation and safety systems, generator set, and dry store 1030, chiller 1032, and freezer 1034. The helicopter landing area may be approximately 22 metres in diameter. Further, the helicopter landing area may be positioned at an outermost edge of the mobile barge. The helicopter landing area may be positioned at a height which is substantially the same as the height of a secondary platform, when the secondary platform, described in further detail below is in the first position, A. The workshop 1023 may be removable and may comprise provision for turbine storage and repair, for the wind energy sector or may comprise provision for well intervention, maintenance and work over equipment for the oil and gas industries. A life raft 1024 may be positioned on top or in close proximity to the workshop. Alternatively, the life raft 1024 may be positioned in close proximity to the primary platform 1003. The life raft 1024 may be a Davit launch boat.

The mobile barge 1001 further comprises a secondary platform 1029, and one or more secondary jacking systems 1031, 1033. The secondary platform may comprise a space reserved for cargo or a lay down area 1036. The cargo or lay down area may be located on the secondary platform towards the outermost part of the secondary platform. The secondary jacking systems 1031, 1033, allows the secondary platform 1029 and each leg 1007, 1009, 1011, 1013 to move relative to each other. The jacking system is usually a rack and pinion type jacking system, but other types of jacking systems may be used. The jacking system may be free floating—self aligning within the primary and secondary hulls. The jacking system may comprise 8 electrically driven rack and pinion jacking systems, or other energy source jacking system. Each jacking system is capable of moving the hull along the legs or vice-versa for jacking operations. Furthermore, each jacking system may be capable of holding the elevated hull during pre-loading, operations and survival conditions. Each jacking system may comprise 3 sets of 6 pinions. Each set of 6 pinions may be fixed at the primary and secondary platforms. Electric motors or other means such as hydraulic may drive the pinion. A leg load monitoring system may be provided. The leg load monitoring system may be connected to the integrated control and jacking control system of the vessel. A rack phase monitoring system may be provided. The Rack Phase monitoring system may be connected to the integrated control and jacking control system of the vessel.

In the embodiment shown in FIGS. 1 and 2, the secondary platform 1029 is substantially rectangular in plan. The secondary platform may also be substantially planar. For example, the secondary platform may have a width and a length which is equal to that of the primary platform 1003. However, preferably, the secondary platform has width which is smaller than the width of the primary platform or the secondary platform has a length which is smaller than the length of the primary platform, or both. This in turn, means that the mass of the secondary platform may be less than the mass of the primary platform. For example, the primary platform may have a mass of approximately 2500 Tonnes, while the secondary platform may have a mass of approximately 1500 Tonnes, although these figures are exemplary only. Having a secondary platform which is smaller or lighter in mass or both smaller and lighter than the primary platform means that the secondary platform can be more easily raised up, further away from the sea level, 1013 by the secondary jacking systems 1031, 1033, so that the secondary platform can be located in close proximity to the turbine blades 1035 or rotor 1037. This reduces the distance through which any components being moved between parts of the wind turbine, such as the rotor or blades, and the barge 1001 have to travel by crane.

The secondary platform 1029 has two substantially planar outer surfaces, one which is oriented in a direction facing away from the sea, and the other surface which is oriented in a direction towards the sea.

Further, each leg may be arranged so that the elongate axis of each leg is substantially perpendicular to the planar face of the secondary platform 1029. The secondary platform 1029 and each leg are movably connected to each other, and this will be explained in further detail below. Usually, the primary platform 1003 is substantially parallel to the secondary platform 1029.

Each leg may extend away from the secondary platform 1029 a certain distance from each substantially planar outer surface of the secondary platform 1029. As explained in further detail below, this means that the secondary platform 1029 and each leg are moveably connected to each other. The secondary platform 1029 may move relative to each leg 1007, 1009, 1011, 1013.

Each leg 1007, 1009, 1011, 1013 may extend through the secondary platform 1029 via an aperture in the secondary platform 1029. This means that each leg may be positioned such that it is within the overall footprint of the secondary platform 1029, when viewed from above, as shown in FIG. 2.

The secondary platform 1029 shown in FIGS. 1 and 2 further comprises one or more secondary jacking systems 1031, 1033 which allows the secondary platform 1029 and each leg 1007, 1009, 1011, 1013 to move relative to each other.

In the embodiment shown in FIG. 1, the secondary platform 1029 is shown in 2 different positions; a first position (shown as A in FIG. 1), and a second position (shown as B in FIG. 1). This will be described in further detail below. The secondary platform 1029 may further comprise a gantry crane 1039 positioned on the secondary platform 1029. As described in further detail below, the gantry crane 1039 may be movable along the length of the secondary platform 1029. The gantry crane may be movable along the planar surface of the secondary platform. A cargo or man ride crane 1041 may also be provided on top of, or in close proximity to, the gantry crane 1039. A further cargo or man ride crane or cranes 1043 may be further provided on the secondary platform 1029. The further crane 1043 may be attached to the secondary platform 1029 so that the position of the crane 1043 is at a substantially fixed or constant position on the secondary platform 1029. The further crane or cranes 1043 may be located away from the centre of the secondary platform 1029 in close proximity to the outermost edge of the secondary platform. This allows cargo or crew to be transferred between the secondary platform and one or more maintenance boats 1045 located on an outermost edge of the primary platform 1003. In the embodiments shown in FIGS. 1 and 2, there are 4 maintenance boats located on the primary platform 1003.

When the secondary platform is in the first position, the secondary platform 1029 is in close proximity to the primary platform 1003. For example, the secondary platform 1029 may be positioned approximately between 10 to 20 metres away from the primary platform 1003. This has the advantage that any components which need to be moved between the secondary platform 1029 in the first position and the primary platform 1003 only have to be moved by a crane over a relatively small distance.

When the secondary platform is in the second position (shown as B in FIG. 1), the secondary platform 1029 is in close proximity to the rotor 1037 or blades 1035 of the wind turbine 1002. For example, the secondary platform 1029 may be positioned between 1 and 2 metres away from the rotor 1037 or blades 1035 when positioned in the second position.

This has the advantage that components which need to be moved between the secondary platform 1029 in the second position and the wind turbine 1002 only have to be moved by a crane over a relatively small distance, such as between 1 and 2 metres.

Because the secondary platform 1029 is moveable between the first and second positions, one or more components can be transported on the secondary platform between the two positions.

Referring now to FIG. 2, it will be seen that in this embodiment, the secondary platform comprises an aperture 1046. The aperture 1046 may be substantially rectangular although any shape aperture may be used. The aperture may have a width of approximately 15 meters and a length of approximately 20 meters. As will be explained in further detail below, the aperture 406 allows components to easily be transferred between the secondary platform 1029 and the primary platform 1003 using the gantry crane 1039 or other crane.

The secondary platform 1029 may further comprise a secondary platform extension 1053, also referred to as a cantilever 1053. The cantilever 1053 is designed to be removable from the secondary platform. This allows multi functional capabilities that can accommodate a wide array of equipment to meet the demands of the wind energy and oil and gas sectors. The secondary platform extension 1053 may also be substantially planar. The secondary platform extension may also be substantially rectangular in shape, in plan view.

The secondary platform extension 1053 may be movable relative to the secondary platform 1029. For example, the secondary platform extension may be slideably movable, for example, using a wheel and track. The secondary platform extension may be movable along the planar surface of the secondary platform 1029. The secondary platform extension 1053 may be moveable between a retracted position, shown as C in FIG. 2, and an extended position, shown as D in FIG. 2. In the retracted position, C, the secondary platform extension lies within the substantially rectangular footprint of the primary platform 1003, when viewed from above, as shown in FIG. 2. In FIG. 2, the secondary platform extension 1053 in the extended position, D, is shown in horizontal line shading. In this position, the extension 1053 extends beyond the substantially rectangular footprint of the primary platform 1003 when viewed from above. In FIG. 1, the secondary platform extension is also viewed in the extended position when the secondary platform is in the second position. This is shown in FIG. 1 as diagonal shading. This allows close access to the wind turbine. The secondary platform extension 1053 may be moved by secondary platform extension moving means, for example a rack and pinion system powered by an electric motor. In FIG. 1, when the secondary platform 1029 is in the first position, the secondary platform extension is shown refracted, within the secondary platform 1029.

The secondary platform extension may also comprise a cut-out section 1047. In the embodiment shown in FIG. 2, the cut out section 1047 is substantially rectangular, although other shapes such a circular or square may also be used. The cut-out section 1047 may extend in one direction from one edge of the secondary platform extension towards the centre of the secondary platform extension. The cut-out section may extend approximately half way along the length of the secondary platform extension in one or more directions.

Operation of the barge 1001 will now be described in further detail. In this example, the barge is used for maintenance, repair or installation of components on a turbine in a wind farm. In general, a control means, such as server or other computerised control system is configured to control operation of the jacking systems, and usually the barge itself.

The barge 1001 is first propelled using the propulsion means and approaches one of the turbines in the wind farm. In this mode of operation, the legs are in the raised position such that they are not in contact with the seabed. This allows the barge to move freely over the sea. Usually, the barge 1001 will approach the turbine at a level which is substantially lower than the height of the access platform 1049 shown in FIG. 1. In this example, the sea level is approximately 18 meters below the level of the access platform 1049. The barge is then manoeuvred using propulsion means so that it is in close proximity to the tower 1017 of the wind turbine. For example one end of the primary platform 1003 may be positioned approximately between 2 to 4 meters away from the access platform 1049 of the turbine depending on the blade configurations and or platform overhang. After the barge is suitably positioned in close proximity to the tower 1017 of the wind turbine, the primary and secondary platform jacking systems are energised. The primary and secondary jacking systems 1019, 1021 then lower the legs towards the sea bed such that the end of the legs closest to the seabed move closer to the seabed 1015. In this example, the primary and secondary jacking systems are synchronously energised. However it is in principle also possible for the legs to be lowered by sequentially energising the secondary jacking system and subsequently energising the primary jacking system.

In both modes of operation, each leg moves relative to the primary platform 1003. At a certain point, the end of the legs closest to the seabed make contact with the seabed 1015.

As the jacking systems 1019, 1021 continue to operate, the barge is raised up away from the seabed, and out of the seawater. In this mode of operation, after each leg has contacted the seabed 1015, the primary platform 1003 moves relative to each leg.

The jacking systems 1019, 1021 then continue to operate until the primary platform 1003 is substantially at the same height as the access platform 1049 of the tower 1017. In this position, an outermost part of the primary platform is in close proximity to the access platform 1049 of the turbine, and this allows for crew and cargo to directly access the access platform, without the need to use a crane or transfer vessel. This position is schematically shown in FIG. 1, with the secondary platform at the first position.

The secondary jacking systems 1031, 1033 are then energised so that the secondary platform 1029 moves along the length of the legs 1007, 1009, 1011, 1013, away from the primary platform 1003. The secondary jacking systems 1031, 1033 continue to operate until the secondary access platform 1029 has moved to the required second position on the turbine 1002 where work is being carried out. For example the second position may be approximately half-way between the turbine access platform 1049 and the rotor 1037 of the turbine. In the example shown in FIG. 1, the secondary jacking systems 1031, 1033 continue to operate unit the secondary platform is in close proximity to one end of the rotor blades 1035 or in close proximity to the rotor 1037 of the wind turbine.

The secondary platform extension 1053 then extends from the secondary platform 1029 towards the wind turbine mast, turbine or rotor 1037 or blade 1035. The secondary platform extension 1053 may be substantially planar and may be substantially co-planar with the secondary platform 1029. The secondary platform extension allows close access, for example within 1 to 2 meters, to the wind turbine, rotor, 1037, blades 1035 and other parts of the wind turbine.

The secondary platform extension 1053 may be substantially rectangular, and as shown in the embodiment in FIG. 2, and as previously described, may comprise a cut away section 1047, which may also be substantially rectangular. The cut-away section of the secondary platform extension 1053 allows the secondary platform to be in close proximity to the turbine such that the turbine may be accessed on at least 3 sides of the wind turbine or for example, through approximately 270° around the turbine.

The gantry crane 1039 is free to move along the secondary platform 1029 between the aperture 1046 and on to the secondary platform extension 1053. The gantry crane 1039 may then be used to move components between the turbine and secondary platform 1029 or the turbine and the secondary platform extension. The components may be moved between the secondary platform and the primary platform through the aperture 1046 in the secondary platform 1029. A key feature of this operation is that because the secondary platform is in the second position, in close proximity to one end of a blade 1035 or rotor 1037, the gantry crane 1039 only has to move components a few meters, compared with prior art systems which use a crane to move components over much larger distances, for example 60 meters or so to the primary platform. This is particularly advantageous in adverse weather conditions or for very heavy components or both.

Once the components have been installed onto the turbine or removed from the turbine, and placed on the secondary platform, the secondary platform extension may be retracted. Then, the secondary jacking systems are engaged and the secondary platform moves from the second position to the first position where it is in close proximity to the primary platform. If components have been removed from the turbine, then these components can be lowered using the gantry crane 1039 or other crane into the workshop 1023, where they may be replaced or repaired and installed or reinstalled as previously described. Once again, this is advantageous because when the secondary platform is in the first position, components only have to be moved through a few meters to the primary platform, rather than by crane over greater distances.

Alternatively, instead of using the gantry crane a component to be installed on the wind turbine can be positioned directly on the secondary platform extension 1053. For example, a complete unit comprising rotor blades and generator may be brought to the tower 1017 on the secondary platform extension 1053. As previously described, the secondary platform, and thus the secondary platform extension may be raised or lowered to the installation height of the unit on the tower. This provides for quick, efficient, and safe installation of the unit on the tower.

Furthermore, embodiments of the invention may also be advantageously used in oil field intervention. This operation is similar to the previous operation described for wind turbines. For example, the well intervention may comprise work performed on the oil or gas well which alters the well in some way. For example, the mobile vessel may transport a new lattice tower to an oil rig structure and position the new tower structure on the oil rig structure. A new line may then be drilled to a well to extend the life of the well. The vessel may position itself alongside an oil or gas platform without the aid of assistant vessels to perform such well intervention and workover projects in conjunction with specialist equipment provided by third parties.

The primary platform 1003 and the secondary platform 1029 may be conjoined using one or more pin members. Thus, the primary hull 1005 and the secondary platform or elevating deck member may be conjoined with the means of pins.

Further, the primary platform 1003 and the secondary platform 1029 may be independently locked in place at any position along the length of the elongate support members using one or more locking means such as locking plates or pins. Thus, the primary hull 1005 and the secondary platform or elevating deck member can each be independently locked in position.

When the primary platform 1003, and therefore the primary hull 1005 is locked at one position on one of the elongate support members, the pins locking the secondary platform in position may be removed. This allows the secondary platform 1029 or elevating deck member to freely travel up and down the full length of the legs above the hull member on its own.

When the primary hull 1005 and the secondary platform are conjoined, the primary jacking system 1019, 1021 and secondary jacking system 1031, 1033, may be configured to operate in tandem to raise or lower the hull.

When the primary platform 1003 and secondary platform 1029 are conjoined or pinned together, the combined jacking mechanism of both platforms may be used for lifting and lowering both platforms.

When the primary hull 1005 is locked in position, the conjoining pins may be removed and secondary platform 1029 or elevating deck may be free to move independently from the primary hull or platform.

This results in less jacking gearboxes and equipment on the primary platform or hull, because the secondary platform jacking system is capable of elevating a much greater mass or weight than may be supported by the secondary platform alone. Thus, secondary jacking system 1031, 1033 may be chosen to have a lifting capacity which is substantially the same as the lifting capacity of the primary jacking system 1019, 1021. Thus, the lifting capacities of the two jacking systems may match. The lifting capacity of the secondary jacking system may be chosen such that it is larger than the load bearing capacity of the secondary platform.

Usually, the vessel has 4 elongate support members. This may allow sufficient space on the primary or secondary platforms for moving or transporting a component of a wind turbine, in particular a wind turbine blade or rotor or wave generator, or tidal turbine.

The component may be moved in a substantially vertical direction by platform elevating using the secondary platform or by gantry crane. An extending deck or/and gantry crane may be used to move the component in a substantially horizontal direction.

The secondary platform extension may comprise a cut-out section which substantially closely surrounds structure such as the wind turbine generator and or wind turbine mast.

The secondary platform extension may be moved in a substantially horizontal direction. The extension may be arranged to capture or/and soft secure the structure such as a wind turbine mast with the extending platform.

The capture may be carried out with an extending planar structure 1055, which is an extension of the secondary platform extension or extending deck. The structure may comprise one or more substantially planar supports each of which may be pivotally attached to one side of the cut out section 1047. When viewed from above, and rotated such that they are substantially parallel with the secondary platform extension, the shape of the extending planar structure closely follows the shape of the structure being captured. In the example shown in FIG. 2, each planar structure is substantially rectangular with a semi-circular portion cut away from the rectangular shape. Each planar structure may be pivotally attached to opposing sides of the cut out section 1047 of the secondary platform extension. Each planar structure may be locked in position so that it is substantially horizontal or parallel to the secondary platform extension.

The extending planar structure may be rotated through 90 degrees from horizontal to vertical, either upwards or downwards.

The capture may be performed by rotating the two half circle cut-outs in the extension, which when rotated from vertical to horizontal, to completely surround the wind turbine mast through 360', providing first stage of capture. In FIG. 2, only 1 extending planar structure 1055 is shown for clarity. An inflatable collar may also be provided which, captures the mast without metal on metal contact, and soft secures the elevating deck and wind turbine mast from relative motion to each other. The inflatable collar may be positioned between the turbine mast and the extending planar structure 1055. This soft capture structure, provides a 360 degree platform, which offers full 360 walkway access to the securing and mounting slew elevation of the complete turbine generator to the wind turbine mast. The inflatable collar for the soft capture may be deployed or not dependent on the circumstances.

As noted above, the secondary platform 1029 may comprise a secondary platform extension. The extension may include shielding to provide a safe and protected environment on the extending platform so that workers on the elevated structure may inspect wind turbine blades, or paint coatings or perform X-ray testing on the structure.

The shielding may provide workers with protection from exposure weather conditions, such as rain, wind, and the like so that they can perform specialised tasks, using specialised equipment or performing specialised processes.

The shielding may also provide a safe and protected environmental enclosure, on the secondary platform extension which allows workers on the elevated platform to perform wind turbine mast steel preparation for paint coatings applications in a controlled environmental condition.

The shielding may provide a safe working environment on the elevated extending platform which allows work to be performed on the wind turbine, the wind turbine blades and the wind turbine mast.

The extending platform may be soft secured as described above, to a structure in a substantially horizontal direction thereby substantially preventing relative motion between the structure and extending platform. Thus, the gantry crane may move a component of the structure, such as wind turbine generator or wind turbine blades, unaffected by high winds, such as storm force acting on any components, such a weights suspended from the gantry crane.

When the vessel is commissioned to operate as an oil field vessel, one or more of the secondary platform or secondary platform extension may be configured to carry a pallet package for oil well servicing.

The vessel may be commissioned to operate as an oil field service vessel to provide enhanced oil recovery servicing equipment.

Each leg may comprise a leg footing which may comprise a spud can structure with a skirt system. The structure of the footing and skirts is designed in a robust way which allows eccentric support from the seabed and impacts during the initialisation stage.

Each of the primary and secondary jacking system may comprise a fixed, opposed rack and pinion type drive, which may be electrically driven. Each jacking system may have a lifting capacity of about 2100 Tonnes per leg. Each jacking system may have a static holding capacity of about 4200 Tonnes per leg. Each jacking system may have a storm holding capacity of about 5592 Tonnes per leg. Each jacking system may operate at about a platform elevating speed of about 0.7 metres per minute.

The vessel may comprise a plurality of elongate support members in which the first drive means comprises a drive system associated with each of the elongate support members and in which the second drive means comprises a drive system associated with each of the elongate support members. One or more sensors may be provided to determine whether the deck or platform is substantially horizontal or level. Measurement data of the angle of the deck or platform relative to horizontal may be measured by each sensor. The data may be fed to a control means which may be configured to control operation of the drive system associated with each of the support members such that the deck or platform or both remain substantially horizontal.

The secondary platform extension may also include an exchangeable module for different applications, such as for use with oil and gas wells, construction or any offshore activity that requires access at varying heights.

The invention claimed is:

1. A vessel for installing or repairing an offshore structure, the vessel comprising:
    a primary platform, the primary platform moveably connected to at least one elongate support member;
    a secondary platform moveably connected to the or at least one further elongate support member in which the primary platform and the secondary platform are moveable in an elongate direction along the or each elongate support member wherein the elongate support member extends through the primary and secondary platforms;
    wherein the primary platform comprises a first drive means for driving the primary platform along one of the elongate support members and the secondary platform comprises a second drive means for driving the secondary platform along one of the elongate support members; and
    a control means for controlling operation of the first and second drive means in a first mode of operation in which the secondary platform and primary platform are synchronously driveable along one of the elongate support members, and wherein the control means is further configured to control the first and second drive means in a second mode of operation in which the secondary platform is driveable independently from the primary platform.

2. A vessel according to claim 1 wherein the control means is further configured to engage a first locking means to lock the primary platform at a predetermined position on one of the elongate support members.

3. A vessel according to claim 2 wherein the control means is further configured to engage a second locking means to lock the secondary platform at a predetermined position on one of the elongate support members.

4. A vessel according to claim 1 wherein vessel further comprises a propulsion system for displacing the vessel relative to the offshore structure.

5. A vessel according to claim 1 in which the secondary platform is constructed to support a maximum supportable load and the second drive means has a maximum lifting capacity which substantially greater than the maximum load supportable by the secondary platform.

6. A vessel according to claim 1 in which the primary platform is constructed to support a maximum load which is substantially greater than the maximum load supportable by the secondary platform.

7. A vessel according to claim 6 in which the maximum lifting capacity of the second drive means is substantially the same as the maximum lifting capacity of the first drive means.

8. A vessel according to claim 1 further comprising a first locking means for locking the position of the primary platform at any predetermined position on one of the elongate support members and further comprising a second locking means for locking the position of the secondary platform at any predetermined position on one of the elongate support members.

9. A vessel according to claim 1 further comprising a first locking means for locking the position of the primary platform at any predetermined position on one of the elongate support members and a second locking means for locking the position of the secondary platform at any predetermined position on one of the elongate support members wherein the first locking means and the second locking means are independently lockable.

10. A vessel according to claim 1 in which the secondary platform is positioned substantially above the primary platform.

11. A vessel according to claim 1 in which the secondary platform comprises an aperture for moving one or more components between the secondary platform and the primary platform via the aperture.

12. A vessel according to claim 1 in which the secondary platform further comprises a gantry crane.

13. A vessel according to claim 12 in which the gantry crane is moveable along at least a portion of the length of the secondary platform.

14. A vessel according to claim 1 further comprising a platform extension moveable between a first position in which the extension is stowed within the secondary platform and a second position in which the extension projects beyond the secondary platform.

15. A vessel according to claim 1 in which the secondary platform is suitable for moving or transporting a component of a wind turbine.

16. A vessel according to claim 1 comprising a plurality of elongate support members in which the first drive means comprises a drive system associated with each of the elongate support members.

17. A vessel according to claim 16 in which the control means is configured to control operation of the drive system associated with each of the support members such that the primary platform or secondary platform or both remain substantially horizontal.

18. A vessel according to claim 1 in which the secondary platform is suitable for moving or transporting a wind turbine blade or rotor or wave generator, or tidal turbine.

19. A vessel according to claim 1 comprising a plurality of elongate support members in which the second drive means comprises a drive system associated with each of the elongate support members.

20. A vessel according to claim 1 wherein the control means is further configured to control operation of the second drive means to drive or further drive the secondary platform along one of the elongate support members.

21. A vessel comprising:
a primary platform moveably connected to at least one elongate support member; and
a secondary platform moveably connected to the or at least one further elongate support member in which the primary platform and secondary platform are moveable in an elongate direction along the or each elongate support member wherein the elongate support member extends through the primary and secondary platforms;
wherein the primary platform comprises a first drive means for moving the primary platform along one of the elongate support members and the secondary platform comprises a second drive means for moving the secondary platform along one of the elongate support members.

22. A method of installing or repairing an offshore structure using the vessel of claim 21, said method comprising the step of controlling operation of the first and second drive means, using a drive control means, wherein the drive control means is configured to control the first and second drive means in a first mode of operation in which the primary platform and secondary platform are synchronously driveable along one of the elongate support members and a second mode of operation in which the secondary platform is driveable independently from the primary platform.

* * * * *